US012763922B2

(12) United States Patent
Ravi et al.

(10) Patent No.: US 12,763,922 B2
(45) **Date of Patent: *Oct. 13, 2026**

(54) ADAPTIVE CLOCK OFFSET ESTIMATION FOR PROTECTION DEVICES WITHOUT TIME-BASED SYNCHRONIZATION

(71) Applicant: Schweitzer Engineering Laboratories, Inc., Pullman, WA (US)

(72) Inventors: Anirudhh Ravi, King of Prussia, PA (US); Veselin Skendzic, Schwenksville, PA (US); Vinod K. Yedidi, King of Prussia, PA (US); Pallavi Kulkarni, Chennai (IN); Jay Hartshorn, Pullman, WA (US); Balaji Janarthanan, Downingtown, PA (US); Angelo D'Aversa, Ambler, PA (US); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/453,267

(22) Filed: Jan. 20, 2026

(65) Prior Publication Data

US 2026/0149554 A1 May 28, 2026

Related U.S. Application Data

(63) Continuation of application No. 19/003,067, filed on Dec. 27, 2024, now Pat. No. 12,556,358.

(Continued)

(51) Int. Cl.

*H04L 7/00* (2006.01)
*H04L 25/02* (2006.01)

(52) U.S. Cl.

CPC ........ *H04L 7/0016* (2013.01); *H04L 25/0202* (2013.01)

(58) Field of Classification Search

CPC ..................................................... H04L 7/0016
See application file for complete search history.

(56) References Cited

U.S. PATENT DOCUMENTS 8,559,146 B2 10/2013 Kasztenny
8,791,730 B2 7/2014 Li (Continued)

FOREIGN PATENT DOCUMENTS

GB 2625495 6/2024
JP 6271114 1/2018

OTHER PUBLICATIONS

European Patent Office, Extended European Search Report, Application No. EP25217856, Mar. 23, 2026.

(Continued)

*Primary Examiner* — Derrick V Rose
(74) *Attorney, Agent, or Firm* — Jared L. Cherry; Richard M. Edge

(57) ABSTRACT

The present disclosure relates to systems and methods for protecting electric power equipment. In one embodiment, an oscillator generates a time signal to timestamp a first stream of data comprising a plurality of local measurements. A communications interface may receive a second stream of data comprising a plurality of remote measurements from a remote source through a communication channel. The second stream of data may include a plurality of timestamps. A clock offset estimation subsystem may determine a plurality of clock offset values based on the second stream of data, analyze the second stream of data; identify a plurality of valid raw clock offset values within the second stream of data; and generate a prediction error. An adaptive filter subsystem may determine an adaptive gain using an adap- (Continued)

tive filter and apply the adaptive gain to the prediction error based on conditions of the communication channel.

20 Claims, 5 Drawing Sheets

Related U.S. Application Data

(60) Provisional application No. 63/616,871, filed on Jan. 2, 2024.

(56) References Cited

U.S. PATENT DOCUMENTS

| | | | | |
|---|---|---|---|---|
| 11,849,016 | B1 * | 12/2023 | Wang | H04L 43/0858 |
| 12,556,358 | B2 * | 2/2026 | Ravi | H04L 7/0016 |
| 2004/0247064 | A1 * | 12/2004 | Yang | H04L 27/2331 375/350 |
| 2011/0063766 | A1 * | 3/2011 | Kasztenny | H02H 3/30 361/63 |
| 2014/0270027 | A1 * | 9/2014 | Oda | H04L 7/0016 375/355 |
| 2017/0059636 | A1 | 3/2017 | Kerger | |
| 2018/0048457 | A1 * | 2/2018 | Dzung | H04L 7/0037 |
| 2023/0077975 | A1 | 3/2023 | Salj | |
| 2026/0149303 | A1 | 5/2026 | Harmukh | |

OTHER PUBLICATIONS

Yingjun Wu, et al."Risk Evaluation Model for Relay Protection Considering Communication Delay and Bit Error", 2014 China International Conference on Electricity Distribution (CICED), Paper No. CP0316, IEEE, Sep. 2014, pp. 360-363.

Manli Li, et al. "False-tirp probability model for the current differential protection considering power grid operation state and communication delay", 5th International Conference on Electric Utility Deregulation and Restructuring and Power Technologies (DRPT), IEEE, Nov. 2015, pp. 2512-2516.

* cited by examiner

ADAPTIVE CLOCK OFFSET ESTIMATION FOR PROTECTION DEVICES WITHOUT TIME-BASED SYNCHRONIZATION

RELATED APPLICATIONS

This application claims priority to U.S. Provisional Patent Application No. 63/616,871 filed on Jan. 2, 2024, and titled ADAPTIVE CLOCK OFFSET ESTIMATION FOR PROTECTION DEVICES WITHOUT TIME-BASED SYNCHRONIZATION, the entirety of which is incorporated herein by reference. This application also claims priority to U.S. Utility patent application Ser. No. 19/003,067, and titled ADAPTIVE CLOCK OFFSET ESTIMATION FOR PROTECTION DEVICES WITHOUT TIME-BASED SYNCHRONIZATION, the entirety of which is incorporated herein by reference.

TECHNICAL FIELD

This disclosure relates to detection, estimation and correction of channel asymmetries in a line current differential protection scheme of an electric power protection system. More particularly, this disclosure relates to the use of the stability of the internal crystal oscillator to detect and correct channel asymmetries for accurate channel delay estimation without the need for any system-wide time synchronization to improve the security and dependability of the protection scheme.

BRIEF DESCRIPTION OF THE DRAWINGS

Non-limiting and non-exhaustive embodiments of the disclosure are described, including various embodiments of the disclosure with reference to the figures, in which.

Figure 1:
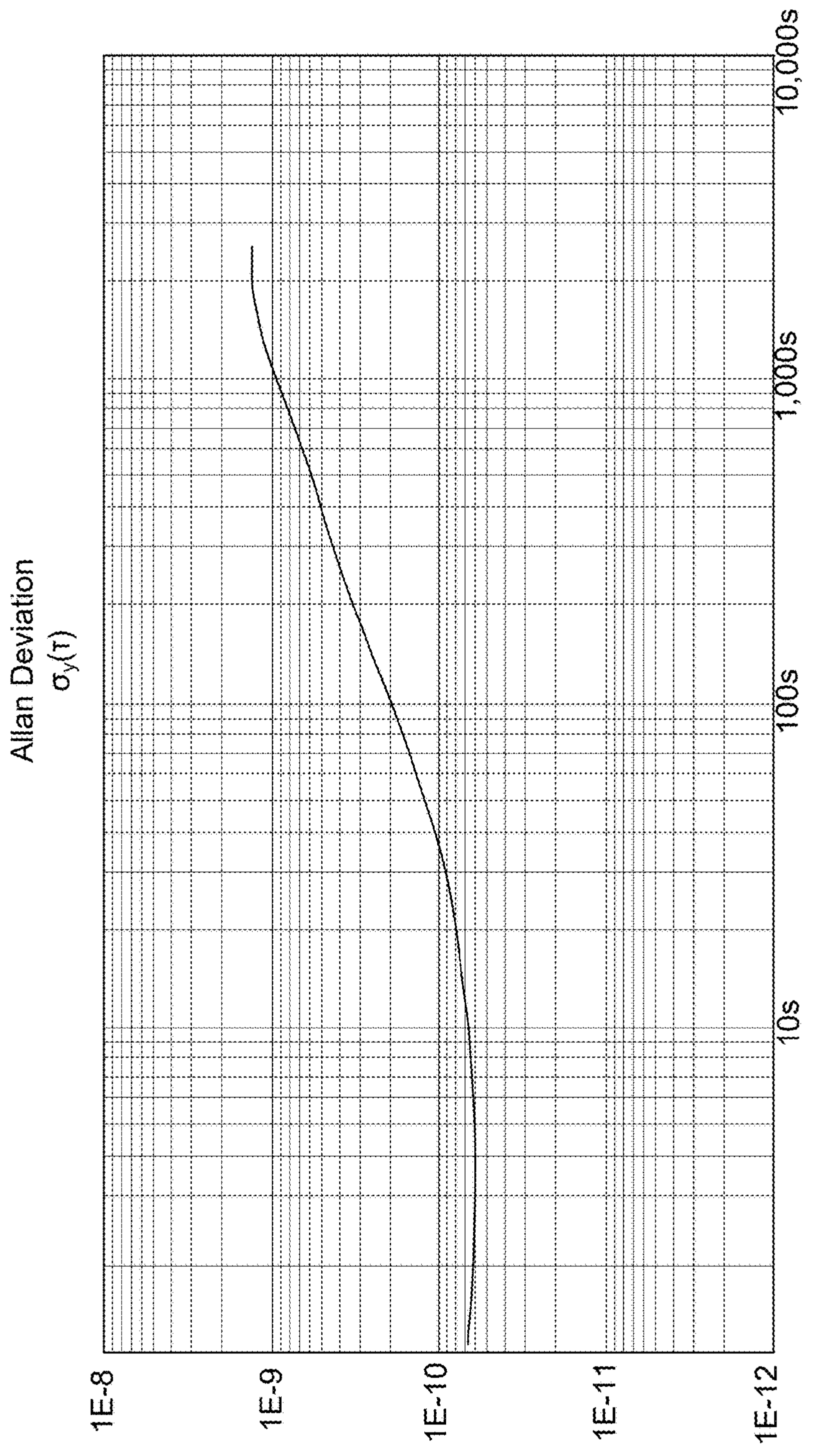
FIG. 1 illustrates a plot and chart of the Allan deviation of a high-stability crystal oscillator clock over time and consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Line current differential relays work based on data exchanged between two or more relays protecting a power line section. Such data can be transmitted with high-speed transmission and minimal attenuation using optical fiber, which is commonly used as the physical medium for such interfaces. Devices that implement such a data exchange may follow the IEEE C37.94 or similar standard, which standardizes the details related to the data exchange so that the devices can follow a common encoding and decoding scheme. A standard data frame may consist of a frame header, overhead, and channel data (a/k/a payload).

The channel data exchanged between the relays includes the sampled currents and timing information. The relay that receives the channel data may use the timing information to estimate the channel delay for aligning the received currents with the locally sampled currents because the received currents arrive after a delay. To accurately estimate the differential current, which is a difference of the local current and the received current, the relay may align the received current samples with the locally sampled current using the estimated channel delay.

The estimate for the channel delay typically remains constant for a direct, point-to-point communication system; however, such systems are typically used for relatively short power lines. Protection of longer power lines may use a data multiplexer that supports C37.94 traffic. Data multiplexers offer the advantage of channel redundancy where the multiplexer moves the traffic from a primary communication channel to a backup communication channel under channel breaks, which results in channel asymmetries. Switching from a primary communication channel to a backup communication channel is termed protected path switching. The sampling rate of these exchanged currents can be either fixed or varying based on the relay sampling frequency. With a fixed sampling rate, a more deterministic exchange can be achieved since the data is sampled at fixed intervals and the transmission also happens at fixed intervals (e.g., every 125 microseconds). Systems utilizing a fixed sampling rate may face the need to re-sample phase currents to the fixed sampling rate, and re-sampling may be computationally intensive. Devices that exchange samples using a variable sampling rate, which the power system frequency may drive, can face challenges with the sampled data not being available for transmission since the transmission occurs at fixed intervals, but the actual data sampling does not.

A difference between the locally sampled phase current data and the remotely sampled data may be represented as operate and restraint currents. Such measurements may be calculated based on data exchanged between line current differential relays. Due to the communication delay between the relays, the local data and the received remote sampled data are not immediately available, and as such, the transmitted data may need to be time-aligned with the local data. The communication delay may be affected by the type of physical medium, the variable sampling rate, processing speeds, and other factors. Time alignment may be implemented indexing and timestamping the sampled data before transmission and using those indices and timestamps for alignment.

A common approach used for channel-based time alignment is the ping-pong method. This method continuously measures the channel delay and the processing delay involved in data transmission to align the local and remote samples, the corrects the timestamp received from the remote relay to the local time and this correction is defined as A simple ping-pong delay measurement approach is vulnerable to short link disruptions and the delay measurement noise. These vulnerabilities may require that the link delay measurements be carefully supervised and filtered.

Various embodiments consistent with the present disclosure may rely on the oscillators in the communicating devices themselves or on oscillators at the local and remote ends of a power line. High-stability oscillators may be included in devices located at the local and remote ends of a transmission line. Some embodiments consistent with the present disclosure may utilize high-stability oscillators that exhibit a 10 PPM stability or better. Such high-stability oscillators may be able to maintain a relatively constant frequency despite a lack of external time synchronization. In some embodiments, oscillators may further be temperature compensated (TCXO) and selected for best short-term stability.

FIG. 1 illustrates a plot and chart of the Allan deviation of a high-stability crystal oscillator clock over time and consistent with embodiments of the present disclosure. The high-stability crystal oscillator clock is to hold its absolute frequency within 10 parts per million over time at less than 1 part per billion for several minutes.

As mentioned previously, differential relays may align the local and remote data by using indices and timestamps. The indices may indicate the packet number that increments within a specified range, and numbers outside the range may identify an invalid packet. Before the end of a transmission interval, if the device could not perform an error check (typically the CRC method is used) on the received data, it cannot evaluate the processing delay involved in transmission (which is the difference in time between remote data being received to local data being transmitted). In such cases, the data is transmitted with a flag indicating that the processing delay could not be computed. On the receiving end, the device decoding the channel data may check for the flag, and if the processing delay is invalid, the clock offset cannot be computed and hence the clock offset is invalid. The variance in the data sampling directly affects the frequency of occurrence of invalid clock offset computations.

A high-stability oscillator may track the clock offset between the communicating devices using the timing information in the data received from the remote device. as described in the preceding paragraph. The offset may represent the difference in time between the local and remote device; however, the ping-pong method assumes the channel is symmetrical. Therefore, under asymmetrical channel conditions, the clock offset calculated using the ping-pong method will have an error that comprises of the channel asymmetry. Inaccuracies in clock offset computation may result in false differential currents that may jeopardize the security of the differential scheme. For systems that use external time synchronization method for data alignment, a loss of external time source under channel asymmetrical conditions may result in either falling back to the ping-pong method or may block differential protection, which may jeopardize the dependability.

Various advantages may be realized by utilizing an adaptive filter. In various embodiments, an adaptive Kalman filter can be used. The adaptive Kalman filter can use an adaptive gain that is decided based on the validity of the raw clock offset measurement. The ability of the filter to use adaptive gains can also help in riding through asymmetrical channel conditions.

Figure 2:
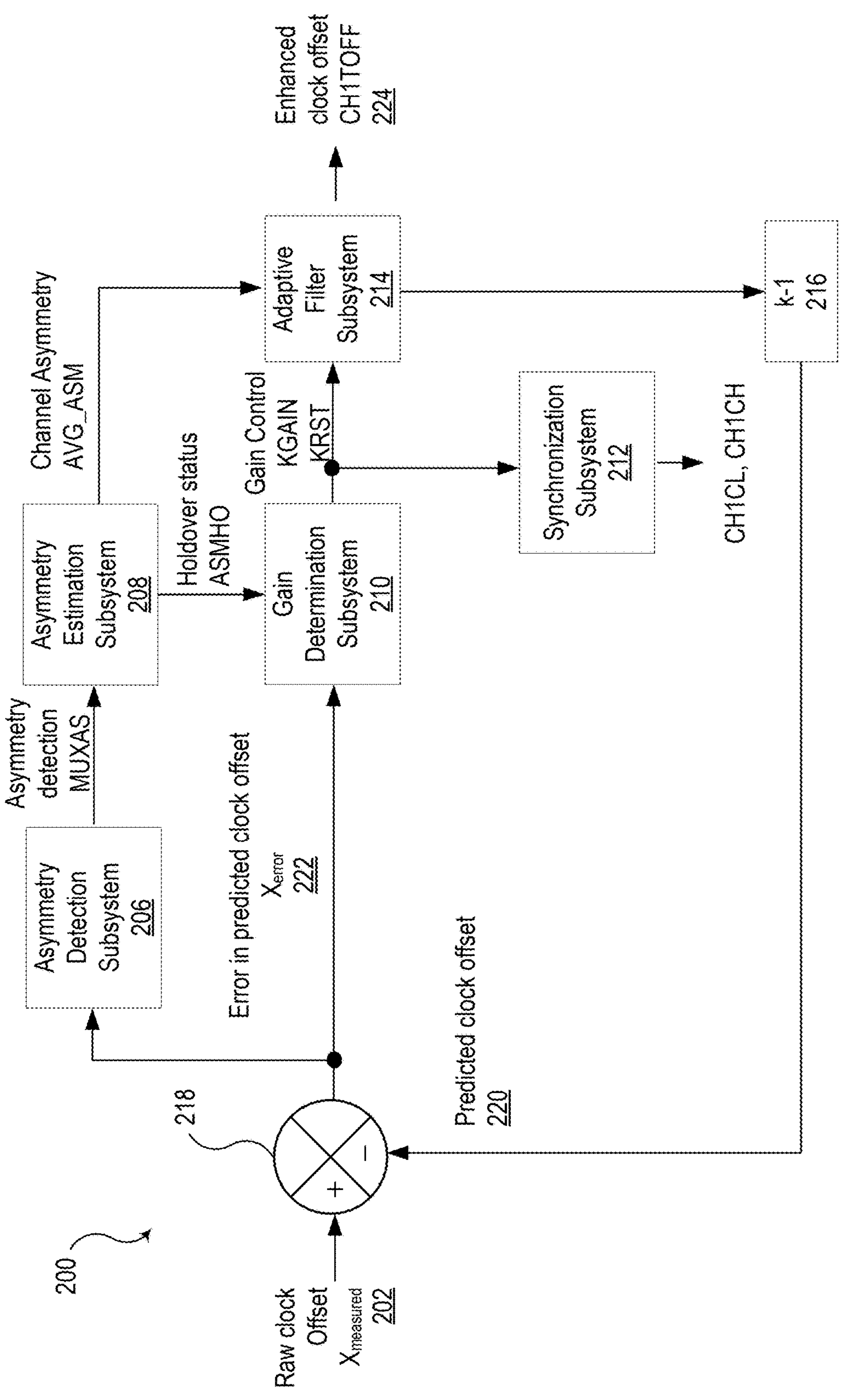
FIG. 2 illustrates a simplified block diagram of a system to estimate a clock offset consistent with embodiments of the present disclosure.

FIG. 2 illustrates a simplified block diagram of a system 200 to estimate an enhanced clock offset 220 ($x_{predicted}$) consistent with embodiments of the present disclosure. System 200 may receive a raw clock offset 202 ($x_{measured}$). As described above, the raw clock offset 202, may be determined using indices and timestamps determined using data received from a remote terminal. A difference 218 between the raw clock offset 202 and the enhanced clock offset 220 is performed to determine the error 222 ($x_{error}$) in the predicted clock offset. The error 222 may be used by an asymmetry detection and estimation subsystem 206 and a gain determination subsystem 210.

Asymmetry detection and estimation subsystem 206 may detect asymmetrical conditions. As described above, asymmetrical channel conditions commonly occur during protected path-switching in time-domain multiplexers. Asymmetrical channel conditions impact an enhanced clock offset 220. Asymmetry detection and estimation subsystem 206 may generate a signal (MUXAS) that represents asymmetrical channel conditions.

An asymmetry estimation subsystem 208 may receive the MUXAS signal from asymmetry detection and estimation subsystem 206 and may determine a channel asymmetry value. The channel asymmetry value may be generated based on prior asymmetry values. In addition, asymmetry estimation subsystem 208 may generate a holdover status signal (ASMHO).

A gain determination subsystem 210 may receive the error in predicted clock offset 222 ($x_{error}$) and holdover status (ASMHO) and may generate a gain signal (KGAIN) and a reset signal (KRST) to be used by an adaptive filter subsystem 214. The gain signal (KGAIN) and the reset signal (KRST) may also be provided to a synchronization subsystem 212.

An adaptive filter subsystem 214 may receive the channel asymmetry value, the KGAIN signal, and the KRST signal, and may generate an enhanced clock offset 224. In various embodiments, adaptive filter subsystem 214 may comprise an adaptive Kalmann filter. In other embodiments, linear prediction filters, Wiener filters, extended Kalman filters, and Bayesian estimation filters may also be used. Adaptive filters, including Kalmann filters, may be used to estimate and predict a system state when the system state cannot be directly measured, or the measurement is not reliable. Typical system states comprise position, velocity, and acceleration. In connection with tracking an oscillator, the position of the system is the clock offset. The rate of change of clock offset is the velocity term, which is estimated to predict the future state of the system. Since two system states need to be estimated, two gains and two measurements may be used. Since the velocity of the clock offset cannot be directly measured, it may be computed based on the raw clock offset 202, and therefore the raw clock offset 202 serves as the primary input quantity for system 200.

The gain values determined by gain determination subsystem 210 may be referred to as alpha and beta. The values of alpha and beta may be used to weight the correction performed by adaptive filter subsystem 214 based on the error difference between the predicted system states and the observed system states. In this embodiment, the system states represent a position and a velocity of system 200. Alpha is associated with the error in system position and beta is associated with the error in system velocity. Since the position error can be invalid (under an invalid input of raw clock offset), the alpha should be adaptive and should not give any weight to the error component but only rely on the prediction. Therefore, the traditional Kalman filter can be made adaptive and applied to handle invalid raw clock offset conditions and asymmetrical channel delays.

Equations 1-7 may be implemented by adaptive filter subsystem 214.

$$x_{estimated}(k) = x_{predicted}(k-1) + \alpha_n(x_{error}(k) - AVG_{ASM}) \quad \text{Eq. (1)}$$

$$x_{error}(k) = x_{measured}(k) - x_{prediction}(k-1) \quad \text{Eq. (2)}$$

$$\alpha_n = \begin{cases} \alpha_1 = 0.0172, & KGAIN = 1 \\ \alpha_0 = 0, & KGAIN = 0 \end{cases} \quad \text{Eq. (3)}$$

$$v_{estimated}(k) = v_{predicted}(k-1) + \beta_n\left(\frac{x_{error}(k) - AVG_{ASM}}{T}\right) \quad \text{Eq. (4)}$$

$$\beta_n = \begin{cases} \beta_1 = 0.0001, & KGAIN = 1 \\ \beta_0 = 0, & KGAIN = 0 \end{cases} \quad \text{Eq. (5)}$$

$$x_{prediction}(k) = x_{estimated}(k) + (v_{estimated}(k) \times T) \quad \text{Eq. (6)}$$

$$v_{predicted}(k) = v_{estimated}(k) \quad \text{Eq. (7)}$$

Where, $x_{estimated}(k)$ is the clock offset for the processing interval k;

$x_{error}(k)$ is the error in the predicted clock offset for processing interval k;

$x_{measured}(k)$ is the raw clock offset for processing interval k;

$x_{predicted}(k-1)$ is the predicted clock offset in previous processing interval (k−1);

$v_{estimated}(k)$ is the estimated rate of change of clock offset;

$x_{predicted}(k)$ is the predicted clock offset in current processing interval (k); and $v_{predicted}(k)$ is the predicted rate of change of clock offset The position prediction error (Xerror) for the active channel is labeled as 87CH1XERR. Since rollover operations may be performed on individual quantities, a raw clock offset can rollover at a different point in time compared to the clock offset (CH1TOFF or Xestimated), especially during channel asymmetry. Therefore, before calculating Xerror, various embodiments may ensure all quantities have the same sign. This may be done by rolling over the raw clock offset back to match with the sign of Xpredicted (old). The specific values of $\alpha_n$ and $\beta_n$ are merely illustrative, and other embodiments may utilize different values.

Adaptive filter subsystem 214 may generate a clock offset 224 that may be used for to adjust the time stamps within a stream of data received from a remote location. The output of adaptive filter subsystem 214 may also be provided to a buffer 216. Buffer 216 may store the clock offset 224 for one processing interval (k) and provide the prior value to adder 218. In one embodiment, the adaptive filter may comprise an alpha-beta (AB) filter that estimates and predicts the clock offset and rate of change of clock offset. The filter uses two gains, namely, alpha and beta to give weightage to the prediction error in position and velocity, respectively. The filter is named "adaptive" because of the switch between two alpha gains based on system condition as described in this section. Since beta is calculated from alpha, the beta gain also switches between two values.

Figure 3:
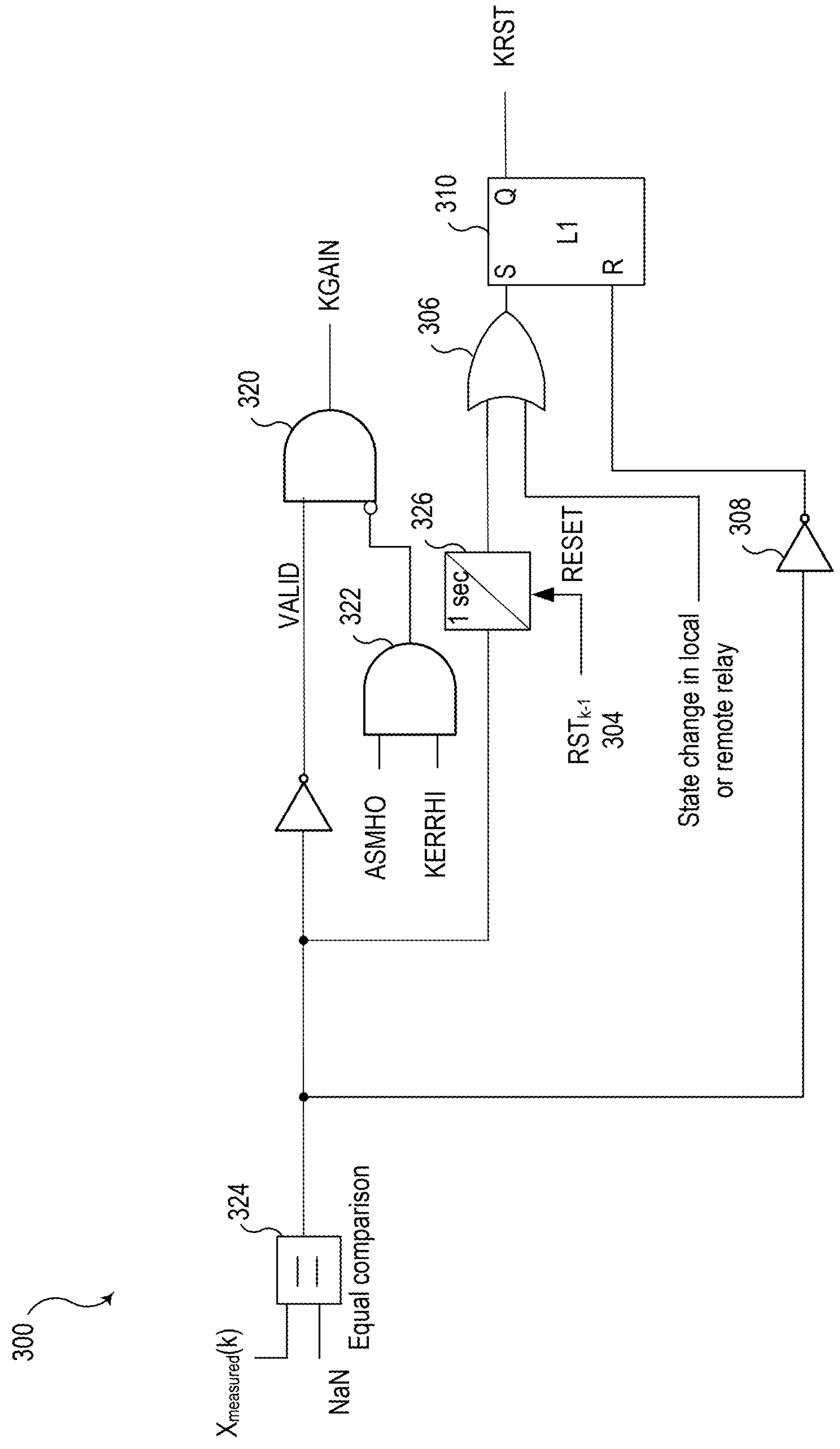
FIG. 3 illustrates a simplified logic diagram for alpha gain control and filter reset consistent with embodiments of the present disclosure.

FIG. 3 illustrates a simplified logic diagram of a system 300 for gain (KGAIN) control and filter reset (KRST) control consistent with embodiments of the present disclosure. The output of system 300 may cause an adaptive filter consistent with the present disclosure to transition between three routines depending on conditions, namely, initialization routine, reset routine and normal operation routine.

An initialization routine is triggered when the system exits the reset routine and may happen when the system is able to estimate a valid clock offset following a prolonged period of invalid clock offset. To obtain the "best guess" of position and velocity, a set of initial positions and velocities may be averaged. The average position and velocity may be used as initial system states.

A reset routine may be triggered by a physical channel break between relays, or if there was an external state change, such as loss of power to the relay or change in user settings. A timer 326 may be used to determine prolonged invalidity of clock offset to trigger a reset routine. During either of these conditions, the local relay cannot calculate raw clock offset therefore, defines the raw clock offset as invalid (not a number or NaN) and asserts the RST signal. System 300 may clear all quantities in response to the assertion of the RST signal.

Under normal operation, if channel asymmetry is detected and estimated (indicated by flag KERRHI) or if there is an asymmetry estimation in progress (indicated by flag ASMHO), KGAIN is cleared by an AND gate 322. The ASMHO signal may be asserted when the asymmetry estimation subsystem 208 is in a holdover state following asymmetry detection. The KERRHI signal may be asserted when a prediction error is greater than a threshold value. In one embodiment, the threshold value may be 10 μs.

Some embodiments may include additional wait periods during initialization to calculate "best guess" estimates for position and velocity. In such embodiments, a number of samples may be stored following the expiration of the 10 counts tracked by timer 314. The first valid position values ($x_{10}$, $x_{11}$, $x_{12}$, $x_{13}$, $x_{14}$) along with their timestamps ($t_{10}$, $t_{11}$, $t_{12}$, $t_{13}$, $t_{14}$) are stored. Then, when the wait period reaches 110 processing intervals, the next set of 5 valid position values ($x_{110}$, $x_{111}$, $x_{112}$, $x_{113}$, $x_{114}$) along with their timestamps ($t_{110}$, $t_{111}$, $t_{112}$, $t_{113}$, $t_{114}$) are stored. Then, 5 velocity values are calculated using. Eq. 8.

$$v_{calculated}(i) = \frac{x_k - x_{k-100}}{t_k - t_{k-100}} \quad \text{Eq. (8)}$$

Where, $x_k$: Raw clock offset at processing interval k.

Then, the calculated velocities are averaged and used for initialization as shown in Eq. 9.

$$v_{estimated}(0) = v_{predicted}(0) = \frac{\sum_{i=1}^{5} v_{calculated}(i)}{5} \quad \text{Eq. (9)}$$

An initial position guess may then be determined. The 5 valid position values ($x_{111}$, $x_{112}$, $x_{113}$, $x_{114}$, $x_{115}$) that were stored for initial velocity calculation earlier are averaged for initial position as shown below. Initial position prediction error is assumed to be zero.

$$x_{estimated}(0) = x_{predicted}(0) = \frac{\sum_{k=111}^{115} x_k}{avgsamp = 5} \quad (10)$$

$$x_{error}(0) = 0 \quad (11)$$

Figure 4:
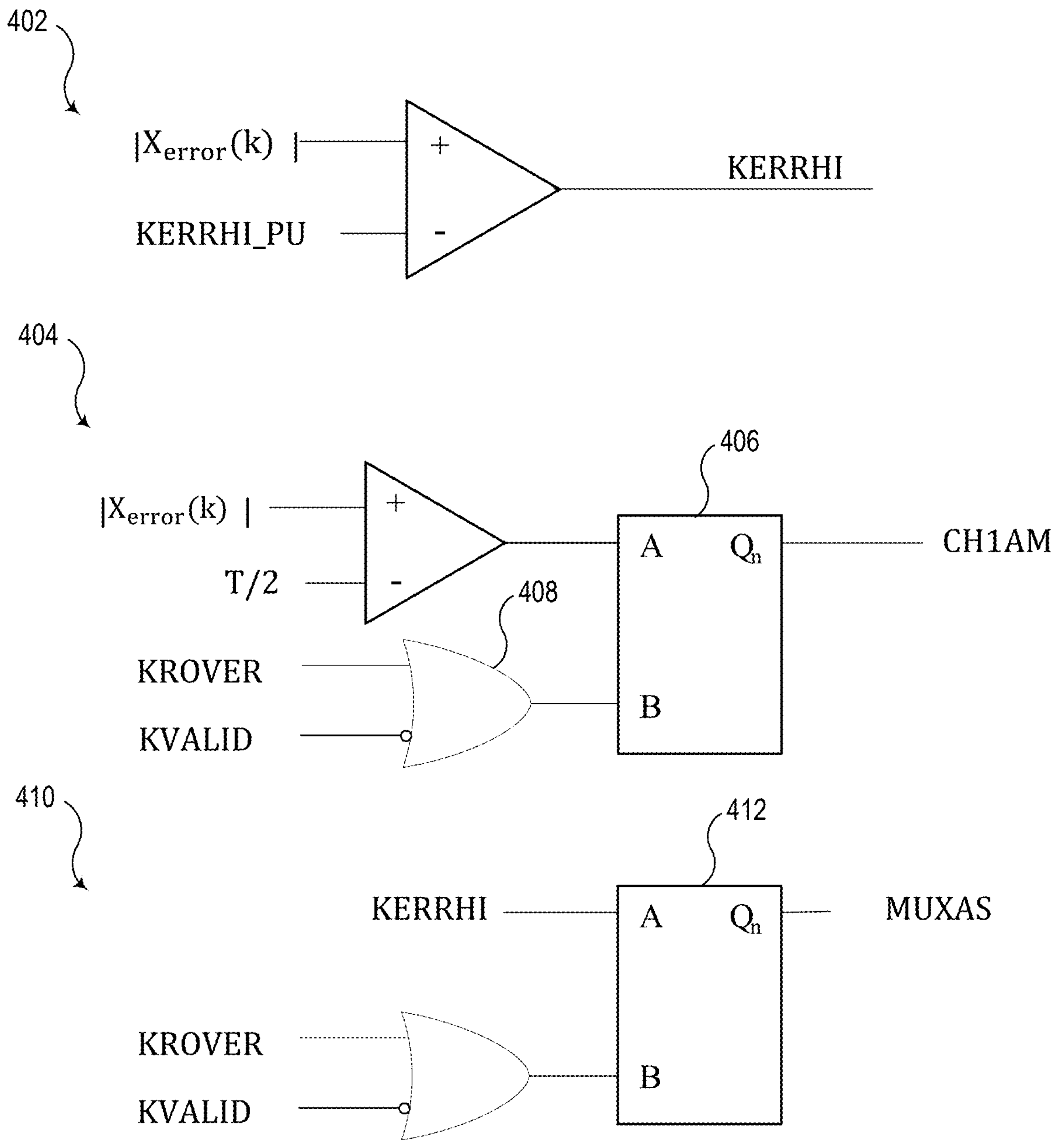
FIG. 4 illustrates a logic diagram for channel asymmetry detection consistent with embodiments of the present disclosure.

FIG. 4 illustrates a logic diagram of a system 400 for channel asymmetry detection consistent with embodiments of the present disclosure. Element 402 may generate a signal (KERRHI) based on a comparison of the absolute value of $x_{error}(k)$ and a threshold value, KERRHI_PU. The threshold value KERRHI_PU may represent an error in position prediction. In one specific embodiment, the value may be 10 μs.

Element 404 may generate an alarm signal (87CH1AM) that asserts based on channel asymmetry. The inputs to element 404 consist of $x_{error}(k)$, T/2, 87KROVER, and 87KVALID. A comparison of of $x_{error}(k)$ and T/2 may be provided to an A-input of an AB flip flop 406. The 87KROVER and the inverse of the 87KVALID signals may be inputs to OR gate 408, which in turn are provide to a B input of AB flip flop 406.

Element 410 may generate a channel asymmetry signal (MUXAS). The KERRIHI signal generated by element 402 may be provide to the A-input of AB flip flop 412. The B-input of flip flop 412 may have the same configuration as the B-input of element 404. The MUXAS signal may be asserted when there is an unexpected jump in the absolute prediction error that cannot happen (physically restricted by the internal crystal oscillator) unless there is a sudden jump in the raw clock offset. Therefore, it is assumed that an external event like path-switching has caused the jump. When channel asymmetry is detected, a system may observe the raw clock offset over a small period to determine the average channel asymmetry (AVG_ASM).

Figure 5:
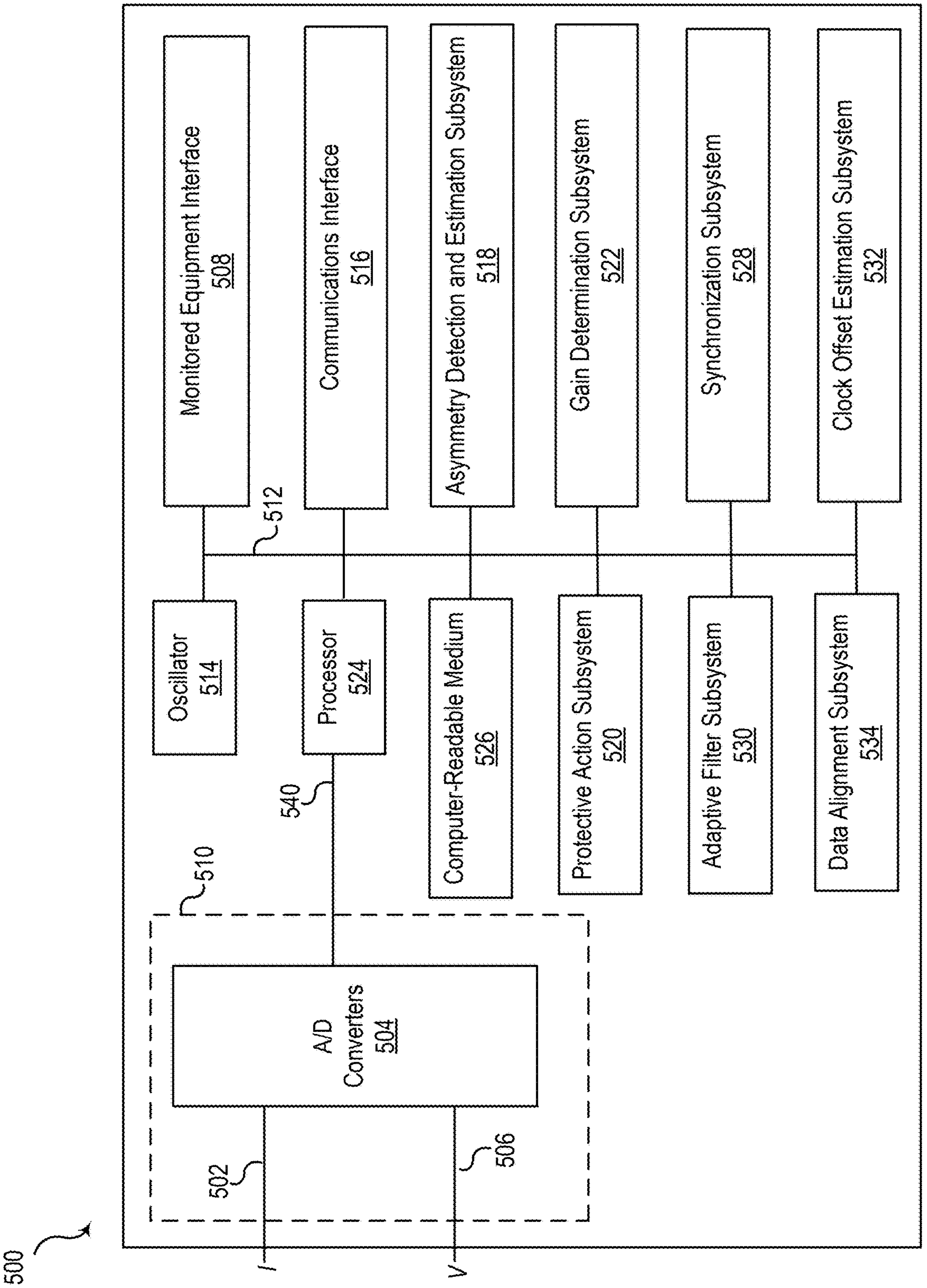
FIG. 5 illustrates a functional block diagram of a system for use in an electric power system and consistent with embodiments of the present disclosure.

FIG. 5 illustrates a functional block diagram of a system 500 for use in an electric power system and consistent with embodiments of the present disclosure. In some specific embodiments, system 500 may comprise a differential line relay. System 500 may be implemented using hardware, software, firmware, and/or any combination thereof. In some embodiments, system 500 may be embodied as an intelligent electronic device (IED), a protective relay, a logic controller, or other types of devices. Certain components or functions described herein may be associated with other devices or performed by other devices. The specifically illustrated configuration is merely representative of one embodiment consistent with the present disclosure. In some embodiments, system 500 may be incorporated into another device, while in other embodiments, system 500 may be embodied as a distinct device.

System 500 includes a communications interface 516 to communicate with merging units, relays, IEDs, and/or other devices. In certain embodiments, the communications interface 516 may facilitate direct communication or communicate with systems over a communications network (not shown). A variety of types of information may be provided to system 500 via communications interface 516. In one specific embodiment, a data stream comprising a plurality of measurements associated with a remote location (i.e., the distant end of a transmission line). Communications received via communications interface 516 may include indices and timestamps generated by a remote device.

An oscillator 514 may be used by system 500 to track the passage of time. Oscillator 514 may comprise a high-stability crystal oscillator clock. In some embodiments, oscillator 514 may comprise a temperature compensated oscillator capable of a 10 PPM stability or better. Oscillator 514 may be able to maintain a relatively constant frequency despite a lack of synchronization. The lack of synchronization may be ameliorated by utilization of the systems and methods disclosed herein. In various embodiments, system 500 may utilize indices and timestamps included in information received via communications interface 516 to determine an offset value between oscillator 514 and a remote device's clock.

A monitored equipment interface 508 may receive status information from, and issue control instructions or protective actions to monitored equipment. In some embodiments, system 500 may perform a specific task within a power system (e.g., acting as a differential protection relay), and monitored equipment interface 508 may enable communication between system 500 and an associated piece of monitored equipment. Control instructions may include, but are not limited to actuating disconnect switches, breakers, or reclosers to selectively connect or disconnect a portion of the electric power system. Of course, commands to operate monitored equipment may also be transmitted via communications interface 516 for implementation by other devices.

Processor 524 processes communications received via communications interface 516, and/or monitored equipment interface 508. Processor 524 may operate using any number of processing rates and architectures. Processor 524 may perform various algorithms and calculations described herein. Processor 524 may be embodied as a general-purpose integrated circuit, an application-specific integrated circuit, a field-programmable gate array, and/or any other suitable programmable logic device. A data bus 512 may provide a connection between various components of system 500.

Instructions to be executed by processor 524 may be stored in computer-readable medium 526. Computer-readable medium 526 may comprise random access memory (RAM) and non-transitory memory. Computer-readable medium 526 may be the repository of software modules configured to implement the functionality described herein.

System 500 may include a sensor component 510. In the illustrated embodiment, sensor component 510 may receive current measurements 502 and/or voltage measurements 506. The sensor component 510 may comprise A/D converters 504 that sample and/or digitize filtered waveforms to form corresponding digitized current and voltage signals. Current measurements 502 and/or voltage measurements 506 may include separate signals from each phase of a three-phase electric power system. A/D converters 504 may be connected to processor 524 by way of data bus 540, through which digitized representations of current and voltage signals may be transmitted. Sensor component 510 may monitor the direction of power flow, and the direction of power flow may be used, along with the result of tap changes, to determine a direction of voltage regulation. As noted above, system 500 may perform specific tasks (e.g., monitoring voltages and/or currents at a location in an electric power system) in addition to other functions described herein.

A protective action subsystem 520 may implement a protective action based on various conditions in an electric power subsystem (e.g., detection of a fault condition or other anomalous condition). Protective actions may include actuating a switching device to interrupt the flow of electrical current through a portion of the electric power system. Protective actions may be implemented directly by system 500 or may be communicated to other devices to be implemented.

An asymmetry detection and estimation subsystem 518 may be configured to detect asymmetrical conditions in a communication channel between system 500 and a remote device. Still further, asymmetry detection and estimation subsystem 518 may calculate an average asymmetry value (AVG_ASM) that may be used by other modules in system 500. Asymmetric conditions may be detected in some embodiments based on a sudden change in the raw clock offset may be detected. Such a change may not physically possible to be naturally caused by a crystal oscillator whose rate of change is very low (e.g., below 10 ppm). This sudden change will lead to a large change in the prediction error that can be detected system 500.

A gain determination subsystem 522 may be used to determine various gain values used in the systems and methods disclosed herein. In various embodiments, different gain values may be used under different conditions. Further, different gain values may be used to estimate various quantities. For example, in embodiments that use an alpha-beta filter, gain determination subsystem 522 may determine the alpha and beta values. These values may be used to weight the prediction error in position and velocity, respectively.

Synchronization subsystem 528 may determine whether a channel-based measurement of the clock offset is available, and if so, whether the measurement is a low-precision or a high-precision value. In one specific embodiment, synchronization subsystem 528 may generate a signal indicating whether the remote data can be aligned. The signal, 87CLKOFF1, may be asserted when the data can be aligned, and the signal may be set to NaN when the data from the remote device cannot be aligned. Still further, the quality of the synchronization (high-precision or low precision) may be established using the signals 87CH1CL and 87CH1CH, as illustrated in FIG. 2.

System 500 may take various actions in response to a lack of synchronization of the communication channel and to the quality of synchronization. In some embodiments, system 500 may suspend typical operation in response to a lack of synchronization. In such embodiments, protective actions may be restrained based on a lack of synchronization. Still further, different thresholds may be applied based on the quality of synchronization.

An adaptive filter subsystem 530 may generate a clock offset. The clock offset may be determined based on inputs from asymmetry detection and estimation subsystem 518, gain determination subsystem 522, and synchronization subsystem 528. In some embodiments, adaptive filter subsystem 530 may be embodied as a Kalman Filter, while in other embodiments, adaptive filter subsystem 530 may be embodied as infinite impulse response (IIR) filter.

A clock offset estimation subsystem 532 may generate a prediction error associated with a stream of data received from a remote source. Clock offset estimation subsystem 532 may analyze a stream of measurements received from a remote source (e.g., a remote differential relay). The measurements may contain a plurality of raw clock offset values. Clock offset estimation subsystem 532 may determine whether each of the plurality of raw clock offset values are valid, and if so, the value may be used to generate a prediction error. Raw clock offset values that are invalid may be discarded. A plurality of the valid raw clock offset values over time may be used to generate a prediction error. In some embodiments, the raw clock offset values may be averaged to generate the prediction error. The prediction error may be validated against a plurality of conditions. Such conditions may include bounded ranges, detection of rollover, channel asymmetry, etc.

A data alignment subsystem 534 may apply the clock offset value to create an adjusted timestamp associated with a stream of data received from the remote source. Data alignment subsystem 534 may use the clock offset, along with time offsets in the received stream of measurements to time-align the data. The time-aligned data may be used in connection with a protection scheme in electric power systems. As discussed above, under certain conditions, synchronization subsystem 528 may identify a lack of synchronization. In response to such conditions, data alignment subsystem 534 may suspend normal operation.

The systems and methods disclosed herein may be used in the absence of external time synchronization to estimate a clock offset to time-align data received from a remote source. Such systems and methods may mitigate against false differential operations and enhance the security and dependability of an electric power system. In addition to handling channel asymmetry by accurately estimating the level of asymmetry, such systems and methods may result in a seamless alignment of remote currents with local currents.

What is claimed:

1. A system for protection of electric power equipment, comprising:

- an oscillator to generate a time signal to timestamp a first stream of data comprising a plurality of local measurements;
- a communications interface configured to receive a second stream of data comprising a plurality of remote measurements from a remote source through a communication channel, the second stream of data from the remote source comprising a plurality of timestamps associated with a plurality of measurements;
- a clock offset estimation subsystem to:
  - determine a plurality of clock offset values based on the second stream of data from the remote source,
  - identify a plurality of valid raw clock offset values within the second stream of data; and
  - generate a prediction error based on the plurality of valid raw clock offset values; and
- an adaptive filter subsystem to:
  - determine an adaptive gain using an adaptive filter; and
  - apply the adaptive gain to the prediction error based on conditions of the communication channel.

2. The system of claim 1, wherein the adaptive filter comprises a Kalmann Filter.

3. The system of claim 1, wherein the clock offset estimation subsystem is further configured to generate an enhanced clock offset value based on the prediction error and the adaptive gain.

4. The system of claim 3, further comprising a data alignment subsystem to apply the enhanced clock offset value to time-align the plurality of remote measurements with the plurality of local measurements for a line current differential protection scheme.

5. The system of claim 1, further comprising:

- an asymmetry detection subsystem to:
  - detect an asymmetrical channel condition based on an unexpected jump in a value of the prediction error and a physical parameter of the oscillator, and
  - generate a channel asymmetry signal indicative of the asymmetrical channel condition.

6. The system of claim 5, wherein the clock offset estimation subsystem is further configured to restrain a protective action based on the channel asymmetry signal indicative of the asymmetrical channel condition.

7. The system of claim 1, further comprising a reset routine to generate a reset signal for the adaptive filter subsystem in response to one of a physical channel break, a loss of power, a change in user settings, or prolonged invalidity of the raw clock offset values.

8. The system of claim 7, further comprising an initialization routine to follow the reset signal and to average a plurality of valid position values and a plurality of velocity values to establish an initial position value and an initial velocity value.

9. The system of claim 1, wherein the clock offset estimation subsystem is further configured to validate the prediction error based on one of a bounded range condition, a rollover detection, and an asymmetrical channel condition.

10. The system of claim 1, further comprising a synchronization subsystem to:

determine an availability of the plurality of clock offset values based on the second stream of data from the remote source;

determine whether the plurality of clock offset values represents one of a low-precision and a high-precision value; and enable alignment of the data from the remote source based on the high-precision value.

11. A method for protecting electric power equipment, the method comprising:

generating, using an oscillator, a time signal to timestamp a first stream of data comprising a plurality of local measurements;

receiving, using a communications interface, a second stream of data comprising a plurality of remote measurements from a remote source through a communication channel, the second stream of data from the remote source comprising a plurality of timestamps associated with a plurality of measurements;

determining, using a clock offset estimation subsystem, a plurality of clock offset values based on the second stream of data from the remote source;

identifying, using the clock offset estimation subsystem, a plurality of valid raw clock offset values within the second stream of data;

generating, using the clock offset estimation subsystem, a prediction error based on the plurality of valid raw clock offset values;

determining, using an adaptive filter subsystem, an adaptive gain using an adaptive filter; and applying, using the adaptive filter subsystem, the adaptive gain to the prediction error based on conditions of the communication channel.

12. The method of claim 11, wherein the adaptive filter comprises a Kalmann Filter.

13. The method of claim 11, further comprising generating, using the clock offset estimation subsystem, an enhanced clock offset value based on the prediction error and the adaptive gain.

14. The method of claim 13, further comprising applying, using a data alignment subsystem, the enhanced clock offset value to time-align the plurality of remote measurements with the plurality of local measurements for a line current differential protection scheme.

15. The method of claim 11, further comprising:

detecting, using an asymmetry detection subsystem, an asymmetrical channel condition based on an unexpected jump in a value of the prediction error and a physical parameter of the oscillator, and generating, using the asymmetry detection subsystem, a channel asymmetry signal indicative of the asymmetrical channel condition.

16. The method of claim 15, further comprising restraining, using the clock offset estimation subsystem, a protective action based on the channel asymmetry signal indicative of the asymmetrical channel condition.

17. The method of claim 11, further comprising generating, using a reset routine, a reset signal for the adaptive filter subsystem in response to one of a physical channel break, a loss of power, a change in user settings, or prolonged invalidity of the raw clock offset values.

18. The method of claim 17, further comprising averaging, using an initialization routine to follow the reset signal, a plurality of valid position values and a plurality of velocity values to establish an initial position value and an initial velocity value.

19. The method of claim 11, further comprising validating, using the clock offset estimation subsystem, the prediction error based on one of a bounded range condition, a rollover detection, and an asymmetrical channel condition.

20. The method of claim 11, further comprising:

determining, using a synchronization subsystem, an availability of the plurality of clock offset values based on the second stream of data from the remote source;

determining, using the synchronization subsystem, whether the plurality of clock offset values represents one of a low-precision and a high-precision value; and enabling, using the synchronization subsystem, alignment of the data from the remote source based on the high-precision value.

* * * * *